May 26, 1936.  T. B. MOREHOUSE  2,042,353
CONNECTION FOR STRUCTURAL MEMBERS
Filed Nov. 5, 1934   2 Sheets-Sheet 1
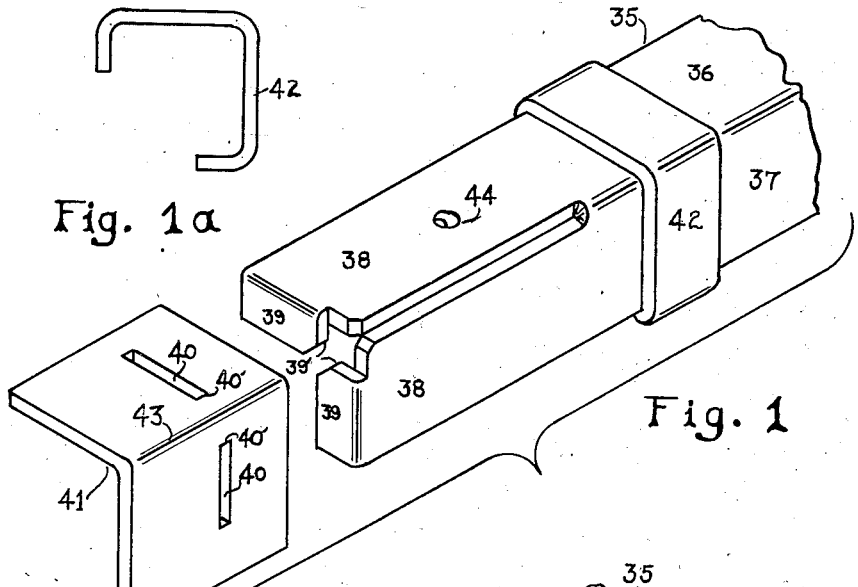
Fig. 1a
Fig. 1
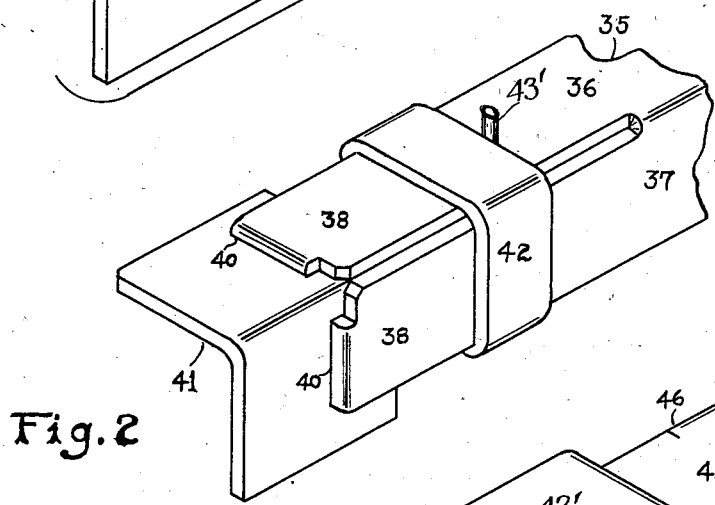
Fig. 2
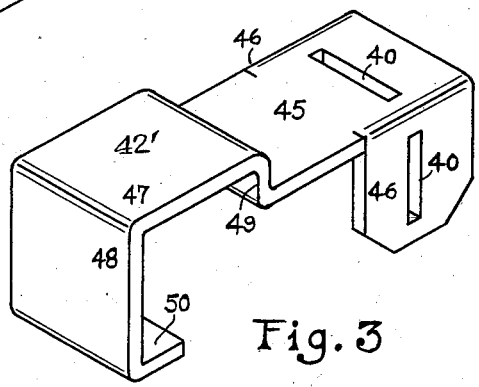
Fig. 3
TERRY B. MOREHOUSE
INVENTOR
BY Frank S. Misterly
ATTORNEY May 26, 1936.  T. B. MOREHOUSE  2,042,353
CONNECTION FOR STRUCTURAL MEMBERS
Filed Nov. 5, 1934  2 Sheets-Sheet 2

INVENTOR
Terry B. Morehouse

Patented May 26, 1936

2,042,353

UNITED STATES PATENT OFFICE 2,042,353

CONNECTION FOR STRUCTURAL MEMBERS

Terry Bryan Morehouse, West Hempstead, N. Y.

Application November 5, 1934, Serial No. 751,464

18 Claims. (Cl. 189—36)

This invention relates to a structural joint and more particularly to such a joint which may be readily attached and detached and which shall be rigid when attached. The invention particularly contemplates joining of two metallic structural pieces without the use of a third or fastening piece.

This application is a continuation in part of my application for Structural joints, Serial No. 696,955, filed November 7, 1933.

In accordance with this invention, each of the members to be attached includes at least one pair of surfaces at right angles to each other. A slip joint is provided between the corresponding surfaces of each of the members, which slip joints are operative at right angles to each other to connect or disconnect the members. The connection means mounted on the two surfaces of one of said members are resiliently related to each other.

It is common in the art to which this invention pertains to join the several members constituting a structure by the use of auxiliary fastenings upon the strength of which the strength of the entire structure depends. The object of this invention is to produce a structural joint in which no fastening member is required and in which the strength of the joint may be more nearly the same as the strength of the members themselves.

The ordinary fastening manipulation requires the use of special tools to join the structure and in some cases is very difficult to perform. Unfastening the ordinary type of structural joint is often more difficult. It is another object of this invention to produce a structural joint which may be connected or disconnected with ease and without the use of special tools.

The usual fastenings are either rigid as riveted joints and resist unfastening, are liable to loosening as bolted joints, or are rigid in only one direction as simple slip joints. It is another object of this invention to produce a structural joint which is rigid in all directions, is not liable to loosening, and which may be readily attached and detached.

An anciliary object of this invention is the provision of a supplemental securing means for rendering impossible accidental detachment of the structural joint constructed in accordance with this invention, yet in no way impeding the intentional detachment.

These and further objects of this invention will become apparent from the following specification taken in connection with the claims and the accompanying drawings.

Metallic structures which are used in the fabrication of houses, are customarily bolted or riveted together, the latter method of connecting being preferred because of strength. Riveting may be replaced in such structures by the use of the present invention in which the members constituting the structure may be joined without the use of rivets or bolts and by a simple manipulation.

Small structures, such as metal cabinets, metal furniture, metal shelving, and temporary metal partitions, usually include a frame work composed of members which are separately connected by rivets or bolts, etc. The present invention contemplates the fabrication of such structures without requiring the use of rivets or bolts.

Structural toys, in which the various members are assembled at one time to produce a certain structure and are later disassembled and reassembled to produce other structures, customarily include fastening devices in the nature of nuts and bolts and clips for holding the various members in predetermined position. Alternative arrangements comprising various types of slip and lock joints have been devised for such toys which, however, do not as a rule give the desired degree of rigidity to the structure and require supplemental bracing. The present invention contemplates the construction of toy outfits which may be readily assembled and disassembled without the use of connecting fastenings and which shall be rigid without requiring supplemental bracing.

In accomplishing the principal object of this invention, a structure is composed of a number of elongated members hereinafter termed "angle" members connected to each other by members which will hereinafter be termed "connection members". In general, each end of the angle members, which as their name implies, are preferably composed of two elongated surfaces at right angles to each other, is provided with one part of the joint constituting this invention. The connection members have at least one pair of surfaces at right angles to each other, upon which surfaces are provided the other part of the joint. The joint is a compound joint composed of two separate slip joints, one between each one of the surfaces of the angle member and the corresponding surface of the connection member. The relative motion between the two parts of each of the two joints is at right angles to that between the parts of the other. Thus, each joint prevents the motion of the two parts of the other joint to disconnect the compound joint. Such motion is permitted by providing for relative motion between the two end surfaces of the angle member preferably by bifurcating the end of the angle member. The separate slip joints may be composed of projections mounted upon the two surfaces of either part of the compound joint and a complementary slit or hole in the two surfaces of the other part of the compound joint. Preferably, the bifurcated ends of the angle member are bent at right angles to their respective surfaces and are received in complementary slots cut in the two surfaces of the connection member.

Security of the structure is provided in accordance with this invention by providing a slider or keeper adapted to slide over the angle member before its attachment to the connection member, and then slide down adjacent the connection member after attachment, to prevent the relative motion of the ends of the angle member to withdraw the end portions from the slots in the connection member. The keeper may be in the form of a special connection member and permit the attachment of a second angle member. This form of keeper may be used in any position intermediate the ends of an angle member and will thus permit the connection of the second angle member at any desired point.

Having thus briefly described the invention, attention is invited to the accompanying drawings in which:

Fig. 1 is a perspective of an angle member and a corresponding connection member adapted to be connected in accordance with the principles of this invention;

Fig. 1a is an end view of a keeper or slider constituting a part of this invention;

Fig. 2 shows the joints of Fig. 1 connected;

Fig. 3 is a perspective showing a special keeper in the form of a special connection member;

Figure 4:
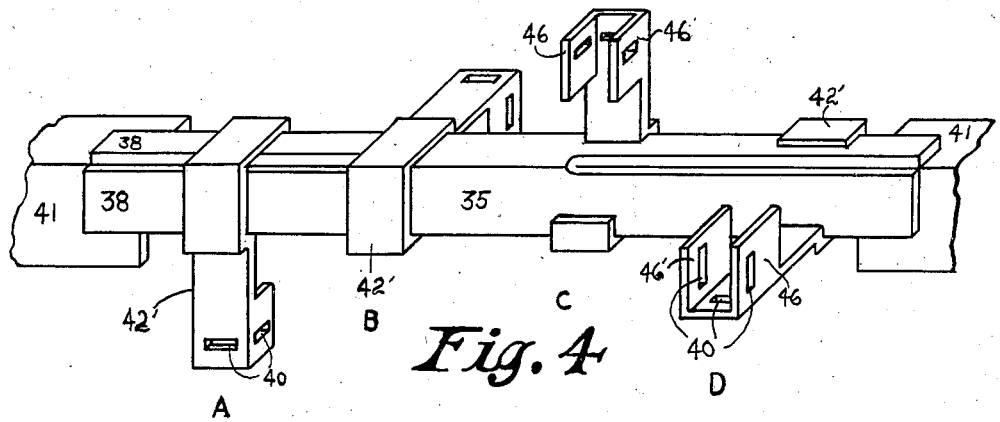
Figure 4 is a perspective view illustrating the uses of the special keeper shown in Figure 3.

Reference is now made to the drawings in which Figures 1 and 2 show the joint comprising this invention with the members thereof disconnected and connected, respectively. In each of these figures, in which corresponding parts are designated by the same reference character, the angle member 35 is an elongated member composed of two surfaces 36 and 37 which are at right angles to each other. The ends of the angle member are bifurcated to permit a relative motion of the angularly disposed end portions 38 of the surfaces 36 and 37. The motion of each end portion, however, is substantially limited to the direction normal to its surface and therefore the motion of the two ends is substantially at right angles. The tip of each end portion is formed or bent at right angles to its surface, forming a pair of angularly disposed resiliently mounted lugs 39 which are for coaction, in a direction normal to surface 38 when the joint is connected, with the pair of complementary slots 40 formed in the corresponding surfaces of the connection member 41. Thus a compound joint is formed composed of two slip joints formed between the lugs 39 and the slots 40, each of which slip joints operates at right angles relative to the other.

The joint is connected by placing the parts with the tips of the end portions 38 on the corner formed by the junction 43 of the surfaces of the connection 41 and with the lugs 39 in line with slots 40. Then the angle member is pressed down on the connection member, thus simultaneously moving the tips of the two end portions 38 in a direction normal to their respective surfaces. This separates the inner corners 39' of the lugs 39 to a position to permit the lugs to coact simultaneously and enter the slots 40. The pressure then being relieved, the lugs snap back into position, as they enter the slots, with their inner corners 39' in their original position. This position is shown in Fig. 2.

To disconnect the joint, the angle member is pressed between its bifurcated ends 38. This acts to spread the lugs and simultaneously remove them from their respective slots 40. An alternative method of disconnecting is to twist the angle member 35, about its axis, relative to connection member 41. This springs one of the lugs 39 out of its slot 40, at which time the other lug will slip easily from its slot.

When connected, the joint just described is very rigid although no extremely accurate fit is required between the lugs 39 and the slots 40. This is because of the fact that a rotation of the angle member relative to the connection member about the line of contact of one lug with its slot is prevented by the coaction of the other lug with its slot, which causes that end portion to act as a brace.

Additional rigidity and considerable security, particularly against accidental detachment, and against detachment by rotation may be secured by means of the "keeper" or "slider" 42. This keeper, which may have the form shown more clearly in Fig. 1a, is slipped over the end of the angle member 35 to the position shown in Fig. 1. In this position the angle member may be attached to the connection member 41 without difficulty. After attachment, the keeper 42 is moved to the position shown in Fig. 2. In this position, the ends 38 of the angle member cannot be moved to remove the lugs 39 from the slots 40. The keeper may be retained in the position shown in Fig. 2 by means of a pin 43' which may be of any appropriate form and may be inserted in the hole 44 in the angle member.

The keeper may be placed upon the angle member in the reverse of the position shown in Figs. 1 and 2, but the securing effect thereof will be the same in both cases.

In reversing the position of the keeper its position is reversed from left to right and from front to rear. Thus the portion of the keeper which is shown as surrounding the angle member will be around the interior angle of the angle member in the reversed position, and the end portions which are shown as projecting into the interior angle will overlap the outside of the angle member in the reversed position.

The keeper may take the form of the special connection member shown in Fig. 3. This member includes a keeper portion 42', which is similar to the keeper 42, and an extension 45 attached as shown.

The extension 45 has two portions 46, formed at right angles to the extension. Slots are provided upon the extension 45 and upon the portions 46. The slot in either of the portions 46 may be used to form a pair with the slot 40 in the extension 45 by means of which an angle member may be attached to the special connection member with the vertical portion either to the front or to the rear as viewed in Fig. 3. The extension 45 may be at any angle from any desired portion of the keeper portion 42' and thus any desired angle may be provided between the angle member on which 42' is mounted and that which is attached to the slots 40. The keeper portion 42' may be mounted upon an angle member in the same position as the keeper 42 shown in Figs. 1 and 2 or may be reversed. Furthermore, when the keeper 42' is placed upon the angle member the position of the extension 45 may be in the plane defined by either of the surfaces 36 or 37 of the angle member 35. Thus an angle member may be attached to a first angle member in any of four directions by means of the special connection member shown in Fig. 3. These four positions are shown clearly in Fig. 4 to which attention is invited. In this figure C and D are the reversed positions, C being the reverse of A and D being the reverse of B.

The special connection member should preferably be formed so that the angle between the surfaces 47 and 48 is slightly less than 90°. This causes the portions 49 and 50 to grip the edges of the angle member to cause a slight friction. Thus the connection member may be placed at any desired position on the angle member to which it is attached to provide for the attachment of a second angle member. Also, if the portion 49 is relatively narrow, the member may be placed on the angle member at any point obviating the necessity of slipping it over the end thereof. To do this, the portion 50 is placed in the desired position and the extension 45 is pressed down, resulting in the member 42' snapping into place around the angle member. It can thus be seen that the special connection member shown in Fig. 3 can act either as a connection member, a keeper, or as both.

It is to be noted that the angle member 35, which is shown as connected to the right of the connection member in Figure 2, may be attached to the left in the same manner if desired.

Figure 5:
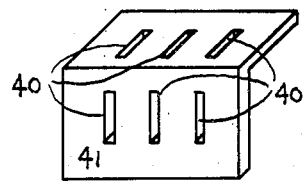
Figure 5 shows a modification of the connection member.
Figure 6:
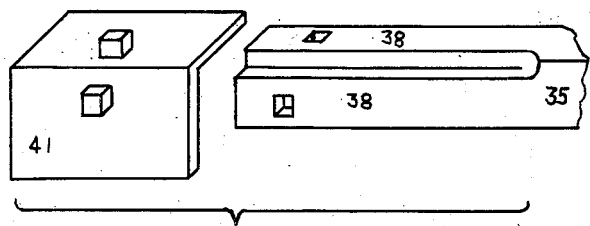
Figures 6, 7 and 8 show modifications of the joint constructed in accordance with the principles of this invention.
Figure 7:
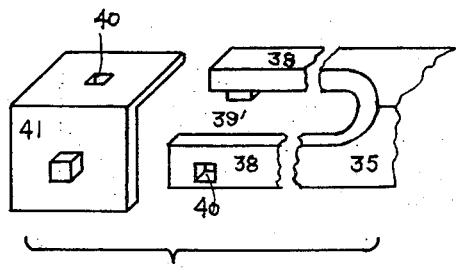

It is obvious that additional pairs of angularly disposed complementary slots may be provided in the connection member 41 of Figs. 1 and 2 for coaction with the lug or pin of the end 38. A connection member constructed in this manner is shown in Fig. 5. In the event two or more pairs of slots are provided in each surface of the member 41, an angle member 35 may be connected in each direction using different sets of slots or holes. When a plurality of pairs of angularly disposed complementary holes or slots are provided in the connection member, the pairs of lugs or projections on the angle member may be inserted in any one of the pairs of slots to permit obtaining various sized structures from the same elements. It is further obvious that the lugs may be provided on the connection member and complementary slots provided on the angle member. Such an arrangement is shown in Fig. 6. Also the connection member may have lugs on one surface and slots on the other, and the reverse on the angle member. Such an arrangement is shown in Fig. 7.

Although as shown in Fig. 1 the corners 39' of the lugs 39 are shown as not normally in contact, this position is not critical. The relative position of these points depends upon the depth of these points from the inner surfaces of the angle member, the thickness of the material from which the connection member is made, and the positions of the inner corners 40' of the slots 40 from the corner 43 of the connection member 41.

Figure 8:
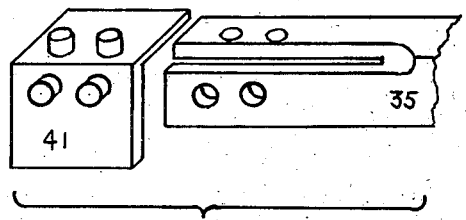

A further modification of the fundamental structure may be made. The angle member 35 may be supplied with one or more slots or holes in each of the ends 38 for cooperation with pins mounted on the corresponding surfaces of the connection member 41. For added strength, two or more sets of pins and holes may be provided, and each of the ends 38 may be provided with one or more slots or holes and one or more pins, and the two surfaces of 41 may then be provided with corresponding pins and slots or holes, respectively. Such an arrangement is shown in Fig. 8.

The connection members may be of a number of types to permit the connection of a plurality of angle members in different directions, as desired. In each member, however, the same requirement must be made. That is, a pair of surfaces must be provided at right angles, with their junction running in the desired direction, and one element of a compound slip joint must be provided in each surface adjacent the junction.

The exact shape of any of the surfaces of the connection members is immaterial. Large connection members may be provided having surfaces at right angles to each other wherever it is desired to attach angle members. Any of said surfaces may provide for the insertion of shaft rods, screws, bolts or nuts wherever desired.

The structural members constituting this invention should preferably be made of metal, though wood, fiber, bakelite, or any other appropriate material may be used for any of the members. Also, angle members or some of them may be constructed of one material and the connection members may be made of another material. Thus a table top may be constructed of hard wood and the legs of a table may be constructed of metal.

Whenever the term "slip joint" is used in this specification and in the following claims, a joint is meant in which the two members are joined by a simple relative motion involving the slipping of a part or projection of one of said members within a complementary slot or hole in the other of said members, the relative motion of the members when joined being limited to the reverse of the relative motion of the members in making the joint and possibly, also, a relative angular motion about the common axis of the connecting elements.

I claim:—

1. A structural joint which comprises a connection member and an angle member, each of said members having two surfaces at right angles to each other, connection means permanently secured on the surfaces of one of said members for co-action with complementary connection means on the corresponding surfaces of the other of said members, the co-action between said connection means when connecting said members being in a direction normal to the surface upon which each connection means is mounted, and resilient means for permitting motion of the connection means on one of the surfaces of one of said members relative to the connection means on the other surface of the same member, whereby the first-mentioned connection means may be separated to a position to permit them to co-act simultaneously with the complementary connection means, by pressing said means upon the corner provided upon the other of said members by the junction of its surfaces.

2. In a structural joint, an angle member having a bifurcated end forming two end portions, disposed at an angle of more than 45° and less than 135° to each other, the tip of each of said end portions including one part of a slip joint, and a connection member including two surfaces at a corresponding angle to each other, each of said surfaces including the complementary part of a slip joint, whereby said angle member may be connected to said connection member by simultaneously removing the tips of said end portions of said angle member relative to each other to permit each of said angularly disposed slip joints to operate at an angle toward each other to connect said members.

3. In a structural joint, an angle member having a bifurcated end forming two end portions, each disposed at an angle of more than 45° and less than 135° to the other, the tip of each of said end portions including a lug, and a connection member including two surfaces at a corresponding angle to each other, each of said surfaces including complementary slots, whereby said angle member may be connected to said connection member by simultaneously moving the tips of said end portions of said angle member away from each other to permit the pair of angularly disposed lugs to enter a corresponding pair of slots to connect said members.

4. In a structural joint, an angle member having a bifurcated end forming right angularly disposed end portions, pairs of projections on the tip of said end portion, and a connection member including two surfaces at right angles to each other, said surfaces including a plurality of pairs of complementary holes, whereby said angle member may be connected to said connection member by simultaneously moving the tips of the end portions of said angle member relative to each other to permit the pairs of projections to enter the pairs of holes in said connection member to connect said members.

5. A structural joint for joining two members including an angle member, said angle member having a bifurcated end forming two end portions, one end portion lying in each of the planes of said angle member, the tips of each of said end portions including a projection for insertion into complementary holes in the other of said members in a direction normal to the surface of said end portions.

6. In a structural joint including a connection member having a pair of slots on angularly disposed surfaces, an angle member including a bifurcated end portion, each side of said end portion terminating in a bent-over portion, said bent-over portion being of less width than the width of the corresponding side of said angle member, and an inclined surface on the inner corner of each of said bent-over portions, said inclined surfaces serving to assist in attaching or detaching said angle member from said connection member yet not affecting the rigidity or security of said joint while said members are attached.

7. In combination, a structural joint comprising two members having two slip joints operable at an angle to each other to connect said joint, and a keeper member slidably mounted on one of said members and movable to a position for preventing the operation of either or both of said slip joints to disconnect said joint, whereby unwanted disconnection of said joint is prevented.

8. In combination, a structural joint including a connection member, an angle member including portions relatively movable to connect said angle member to said connection member, and keeper means slidably mounted on said angle member and movable to a position for preventing relative motion of said portions of said angle member, whereby unwanted detachment of said connection and angle members is prevented.

9. In combination, a structural joint including a connection member, an angle member including portions relatively movable to connect said angle member to said connection member, movable keeper means movably mounted on said angle member and movable to a position thereon for preventing relative motion of said portions of said angle member, and means for securing said keeper in the last-mentioned position, whereby unwanted detachment of said connection and angle members is prevented.

10. In combination, a structural joint including a connection member, an angle member having portions relatively movable to connect said angle member to said connection member, and rigid keeper means operatively related to said angle member for preventing relative motion of the said portions of said angle member, whereby detachment of said connection and angle members is prevented, said keeper means including connection elements permitting the attachment of a second angle member thereto.

11. In combination, a structural joint including a connection member, an angle member having portions relatively movable to connect said angle member to said connection member, and rigid keeper means operatively related to said angle member for preventing relative motion of said portions of said angle member, whereby detachment of said connection and angle members is prevented, said keeper means including three connection elements permitting the attachment of a second angle member thereto in either of two positions extending in the same direction.

12. In a structural joint, a connection member, an angle member, co-planar connection means mounted upon the two surfaces of said angle member for interlocking engagement with said connection member, and resilient mounting means for permitting a relative motion of said connection means.

13. In a structural joint, an angle member having a bifurcated end forming two angularly disposed end portions, co-planar and inwardly extending connection means mounted upon said end portions.

14. In a structural joint, an angle member, a projection formed at the end of each surface of said angle member and extending inwardly thereof, said projections being co-planar, and means for permitting a relative motion of said projections.

15. In a structural joint, an angle member having a bifurcated end forming two angularly related end portions, at least one projecting connection member mounted upon each of said end portions, a projecting connection member on one of said end portions being co-planar with one on the other of said end portions, said connection members extending inwardly of said angle member.

16. In a structural joint, an angle member having a bifurcated end forming two angularly related end portions, a bent over lug portion at the end of each of said end portions, said lug portions each extending inwardly of said angle member, and being spaced from the apex of said angle member.

17. In a structural joint, an angle member having a bifurcated end forming two angularly related end portions, co-planar bent over lug portions at the end of said end portions, said lug portions extending inwardly of said angle member.

18. In combination, a structural joint comprising two members having two slip joints operable at an angle toward each other to connect said joint, and a keeper member surrounding and slidably mounted on one of said members and movable to a position for urging the portions of the slip joints embraced thereby toward each other for preventing the operation of said slip joints to disconnect said joint.

TERRY B. MOREHOUSE.

Patent No. 2,042,353                                            Granted May 26, 1936

TERRY BRYAN MOREHOUSE

The above entitled patent was extended February 26, 1952, under the provisions of the act of June 30, 1950, for 5 years and 38 days from the expiration of the original term thereof.

*Commissioner of Patents.*